Oct. 29, 1968  P. F. MUELLER  3,408,143
STORAGE AND READOUT OF MULTIPLE INTERLACED IMAGES
Filed Dec. 1, 1965  2 Sheets-Sheet 1
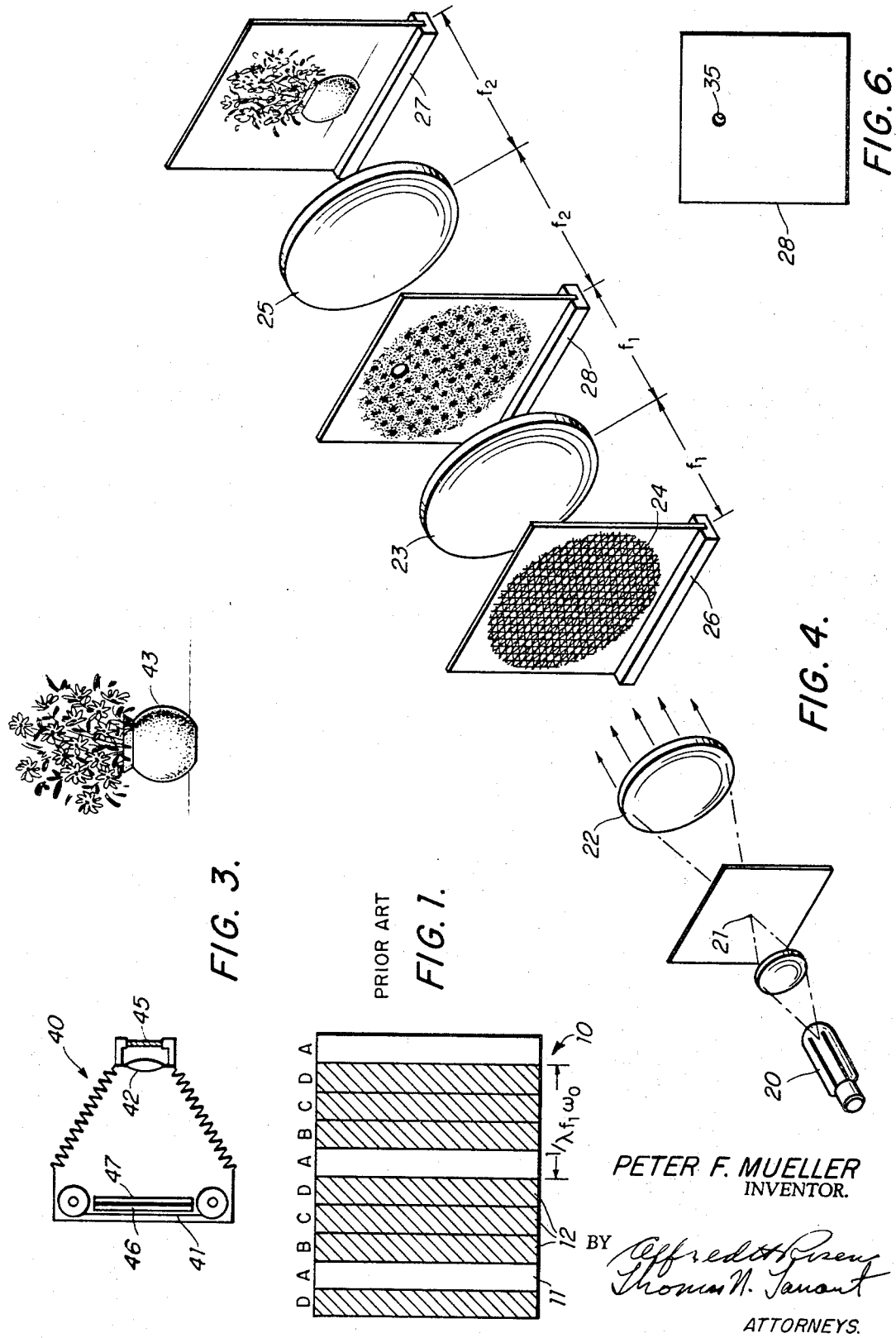
PETER F. MUELLER
INVENTOR.
BY
ATTORNEYS.

Oct. 29, 1968    P. F. MUELLER    3,408,143
STORAGE AND READOUT OF MULTIPLE INTERLACED IMAGES
Filed Dec. 1, 1965    2 Sheets-Sheet 2

PETER F. MUELLER
INVENTOR.

BY
ATTORNEYS.

United States Patent Office 3,408,143
Patented Oct. 29, 1968

3,408,143
STORAGE AND READOUT OF MULTIPLE
INTERLACED IMAGES
Peter F. Mueller, Concord, Mass., assignor to Technical Operations, Incorporated, Burlington, Mass., a corporation of Delaware
Filed Dec. 1, 1965, Ser. No. 510,838
7 Claims. (Cl. 355—40)

ABSTRACT OF THE DISCLOSURE

Photostorage retrieval methods and apparatus wherein a plurality of images are recorded on the same area of a photosensitive material and then selectively retrieved by the use of a coherent optical detection system and spatial filtering techniques. The recording of multiple images on a common area of a photostorage medium is accomplished by interlacing the various images and respectively multiplying each of the interlaced images with a spatial carrier having a predetermined angular orientation and frequency. Fourier transformation of the record thus formed will effect a spatial separation of the object spectra associated with the interlaced images. By appropriate spatial filtering in the Fourier transform space, a selected one or more of the interlaced images may be retrieved.

---

Since the human eye has fairly low resolution capabilities as compared to modern photographic materials, i.e., about 10 lines per millimeter as compared to 1,000 lines per millimeter, it is well recognized that a substantial number of images can be stored by interlacing without any significant degradation when viewed by the human eye. One significant difficulty with interlacing is the requirement of re-registering the interlace screen for recovering the separate images.

In the British Journal of Photography of Aug. 3, 1906, pp. 609–612, an article entiled "Improvements in the Diffraction Process of Colour Photography" appears by Herbert E. Ives. This very enlightening article describes among other things an interlace process in which three diffraction gratings are multipled with respective color separations to reproduce a color image. The gratings are either gratings of different frequencies to provide the three colors or a grating of one frequency rotated at specific angles with respect to a slit source for obtaining the desired colors. As will be seen, the relationships of angles and frequencies are quite different in the present application in which the gratings are not used to provide color.

Now in accordance with the present invention each of the separate images is multiplied with a diffraction grating and recorded on a photostorage medium. A photostorage medium for purposes of this invention is defined as a medium which, at least for a period of time, is sensitive to light such that an image of light intensity variations can be impressed upon the medium and will be retained thereby in some form for an extended period of time. Photographic and electrophotographic films and plates are exemplary.

The diffraction gratings for each of the images are selected and orientated with respect to the gratings of the other images so that the spectrum of a selected image diffraction order convolved with at least one diffraction order of its respective grating can be separated out by a spatial filter in a transform plane of a coherent optical system. A spatial filter is defined as an object placed in a transform plane of an optical system for modifying amplitude and/or phase of selected spatial frequencies. Thus it is an object of the present invention to define a novel system of interlace image storage.

It is a further object of the invention to define a system of gratings for enabling separate readout of a plurality of interlaced images in a coherent optical system.

It is still a further object of the invention to define an arrangement of diffraction grating modulations of images stored on a photostorage medium.

Further objects and features of the present invention will become apparent upon reading the following specification together with the drawings in which:

FIG. 1 is prior art illustrating interlaced images;

FIG. 3 illustrates diagrammatically camera apparatus for obtaining a photographic image as illustrated in FIG. 2;

FIG. 4 is an isometric of a coherent optical system for recovering the individual objects from the interlaced image of FIG. 2;

FIG. 6 is an illustration of a spatial filter for use in FIG. 4;

FIG. 1 illustrates a conventional interlace printing arrangement. An interlace screen 10 is depicted by the cross-hatched areas and a sequence of four images A, B, C, and D are depicted as divided into interlace lines. These images are recorded on a photosensitive material by using a screen that is transparent over one line width 11 and then opaque for three line widths 12 and then transparent again for one line width. The screen 10 is depicted in FIG. 1 as having the transparent line coincident with the A image areas. The B image is exposed by moving the screen one line width to the right and so forth. The screen is made with a high enough frequency so as either to be invisible to the eye or at least not bothersome. As has been stated, readout is a problem because it requires accurate re-registration of the screen.

Figure 2:
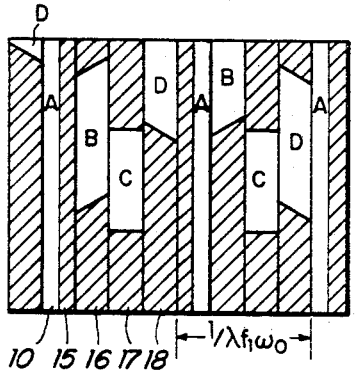
FIG. 2 depicts an interlaced image in accordance with an embodiment of the present invention.

FIG. 2 illustrates an arrangement of interlace imaging in accordance with the invention. This arrangement is designed for four images as in FIG. 1 and uses an interlace screen similar to that in FIG. 1 having a spatial frequency $\omega_0$ with each period made up of a transparent line followed by an opaque line three times the width of the transparent line. In addition to this screen four amplitude diffraction gratings are used, one for each of four scenes to be recorded. An amplitude diffraction grating is defined as one that alters amplitude (i.e. intensity in incoherent illumination) transmission with no substantial alteration of phase. Since original exposures in the present invention are made with incoherent light, only intensity variation are important and phase variations introduced by the gratings will be ineffective. Thus the gratings can have inherent phase altering characteristics without any resultant effect in the present invention.

With the interlace screen 10 in a first position, a first diffraction grating 15 is superimposed with the interlace screen, the diffraction grating having a frequency $\omega_0/2$, one-half that of the interlace screen. This first diffraction grating 15 has an angle of zero degrees with respect to the interlace screen so that the lines of the two are parallel.

In FIG. 2 the lines of the interlace screen and the first grating are shown as vertical. A photosensitive medium is exposed to a first scene through this arrangement. The scene screen 10 and grating 15 expose the photographic medium as a product.

Then the interlace screen is moved the width of its transparent line in a direction perpendicular to the line and the diffraction grating is exchanged for a second diffraction grating 16 also having a frequency one-half that of the interlace screen with its lines set at an angle of 60 degrees with respect to that of the interlace screen. This, of course, can be the grating used for the first scene rotated 60 degrees clockwise. An exposure to a second scene is made with this arrangement.

Then again the interlace screen is moved one transparent line width as before in the same direction and the grating is again exchanged for a third diffraction grating 17 having a frequency that is $\omega_0\sqrt{3/2}$. Grating 17 is set at an angle of 90 degrees with respect to the screen. The third exposure is then made.

Once again the interlace screen is moved one transparent line width as before in the same direction and again a diffraction grating is exchanged for a fourth grating 18 having a frequency of one-half the frequency of the screen positioned at an angle of 120 degrees with respect to the screen. Grating 18 being suitably the same grating used for making the first two exposures rotated clockwise a total of 120 degrees from the position used in the first exposure. The fourth exposure is then made and the interlaced image developed. In each exposure the scene is multiplied with the grating and the screen and the resultant products are summed in the photosensitive medium.

In order to produce well separated images in accordance with the invention, the frequency of the interlace screen for the above exposures is preferably at least four times the maximum scene frequency and the resolution capabilities of the photographic film should be at least $2\omega_0$ twice the frequency of the interlace screen. As will be recognized these relationships are merely to satisfy the sampling requirements commonly used for communication theory. Thus, for example, if the maximum frequency in the scenes is 30 lines per millimeter the interlace screen should have a frequency of 120 lines per millimeter and the photographic film must have a resolution capability of 240 lines per millimeter.

FIG. 3 shows a suitable camera arrangement for making exposures as described in FIG. 2. A camera 40 contains a photographic film 41, an optical system 42 for imaging an object, as for example, a vase of flowers 43, onto film 41. The optical system of the camera is suitably associated with, or includes means for limiting the maximum scene resolution. Thus for example a grained filter such as a piece of very lightly frosted glass 45 may be positioned in the optical path for limiting resolution. An interlace screen 46 and a diffraction grating 47 are positioned adjacent to the photographic film in the optical path. After multiple exposure and development the independent scenes are separated out in a coherent optical system as depicted in FIG. 4.

FIG. 4 illustrates diagrammatically an optical system for viewing or recording interlaced images in accordance with the invention. Thus FIG. 4 illustrates a fairly conventional coherent optical system comprising light source 20, pin hole aperture 21, collimating lens 22, converging lenses 23 and 25 separated by the sum of their focal lengths $f_1$ and $f_2$, frame means 26 for supporting an object, and support means 27 for supporting a photosensitive medium or display screen. A spatial filter 28 is also depicted in the back focal plane of lens 23 and the front focal plane of lens 25.

For purposes of the invention light source 20 should be an intense light source and an arc lamp or laser are suitable. A mercury arc lamp was used in carrying out the examples described herein.

The pin hole aperture 21 is used to increase the coherency of the light and collimating lens 22 following the aperture provides a collimated beam of a selected diameter. With a collimated beam the distance between the collimator and the rest of the system becomes non-critical. With an uncollimated beam magnification can be obtained.

The back focal plane of lens 23 in which filter 28 is positioned, is called the Fourier transform plane. It can be seen that the collimated beam from collimating lens 22 will be brought to a focus at the transform plane. If the beam is not collimated, the optical system must be arranged so that the beam is still brought to a focus in a transform plane to coincide with a spatial filter. Further optics can also be used at the image end of the system for magnifying or reducing the size of the image.

Light from source 20 must be at least partially coherent at the illumination plane where an object (composite stored image) supported in frame 26 is illuminated. The required degree of coherence is related to the object resolution. Preferably the coherence length (the distance between two extreme points of coherence in the illumination plane) is equal to or greater than 3 divided by the highest frequency in the object in lines per millimeter, i.e. $3/\omega_0$. For purposes of the present invention the highest frequency in the object can be considered to be the interlace frequency.

Figure 5:
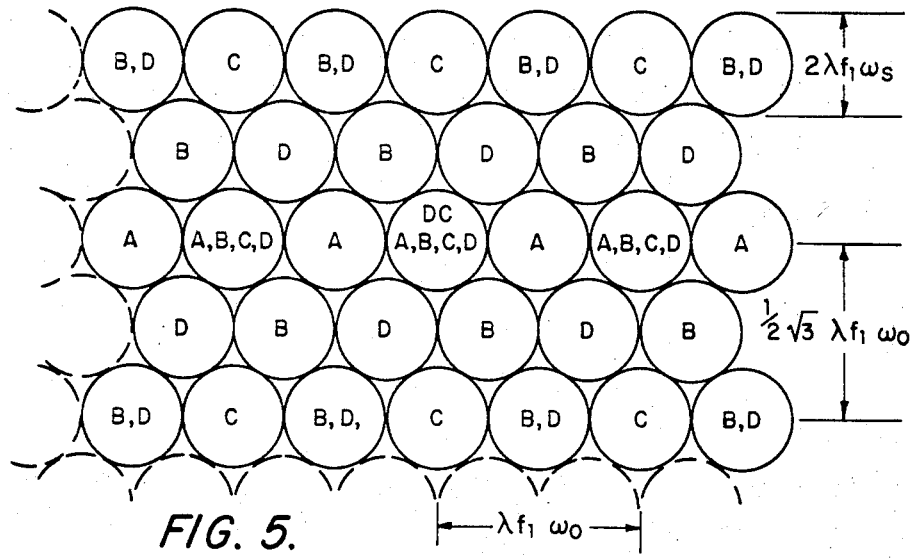
FIG. 5 illustrates the diffraction patterns that will appear in the transform plane of FIG. 4 related to each of the diffraction gratings convolved with the images in FIG. 2.

With an interlaced photographic transparency positioned in frame 26, a diffraction pattern will show up in the transform plane. This diffraction pattern is depicted in FIG. 5. Collimated light that is undisturbed by the transparency will be focused to the center of the transform plane as a spot illustrated as the central spot in FIG. 5. This spot represents the zero order of each of the gratings and is commonly called the DC spot. Since this spot is independent of grating orientation or frequency, it will be common to all of the interlaced images. One of the purposes of the spatial filter 28 is to block this DC spot. The grating angles and frequencies described above were selected to give optimum packing density of the diffraction orders as depicted in FIG. 5. With one to one imaging this arrangement places the spots of the different diffraction orders in a mosaic pattern in which each of the diffraction spots has a diameter of $2\lambda f_1 \omega_s$, where $\lambda$ is the wavelength of the illuminating light, $f_1$ is the focal length of lens 23 and $\omega_s$ is the maximum scene frequency.

The center to center spacing of diffraction orders in which all four scenes are mixed along a first primary axis, for example, the $x$ axis (horizontal) is $\lambda f_1 \omega_0$ wherein $\omega_0$ is the frequency of the interlace screen. The center to center separation of diffraction orders on a second primary axis $y$ perpendicular to the first primary axis will in the present instance be $\omega_0 \lambda f_1 \sqrt{3/2}$. It will be seen that one of these axes is related to the screen orientation and the other is related to the grating that is used perpendicular to the screen.

The scenes that are represented in diffraction orders are indicated by the scene letter placed in the center of each diffraction spot. It will be seen that each of the recorded scenes appears by itself in a first order diffraction providing maximum signal intensity.

By placing a spatial filter 28, as illustrated in FIG. 6, made of an opaque material and having a transparent aperture 35 in the transform plane of the coherent readout system we can pass a selected diffraction order containing substantially information of only one of the four scenes. Referring again to FIG. 5, a single spatial filter can be used and rotated to select one of the scenes A, B and D. However the aperture will have to be located at a different radius to pick up scene C. As will be recognized more image light can be passed through the system by locating apertures in the spatial filter to pick up a plurality of diffractions containing a specific image. In some situations this can be desirable, however it places additional stringent requirements on the optical system to insure precise registration of the images passed from each of the diffraction spots. Slight defocussing can produce some displacement of an image passing through one of the diffraction spots.

Figure 7:
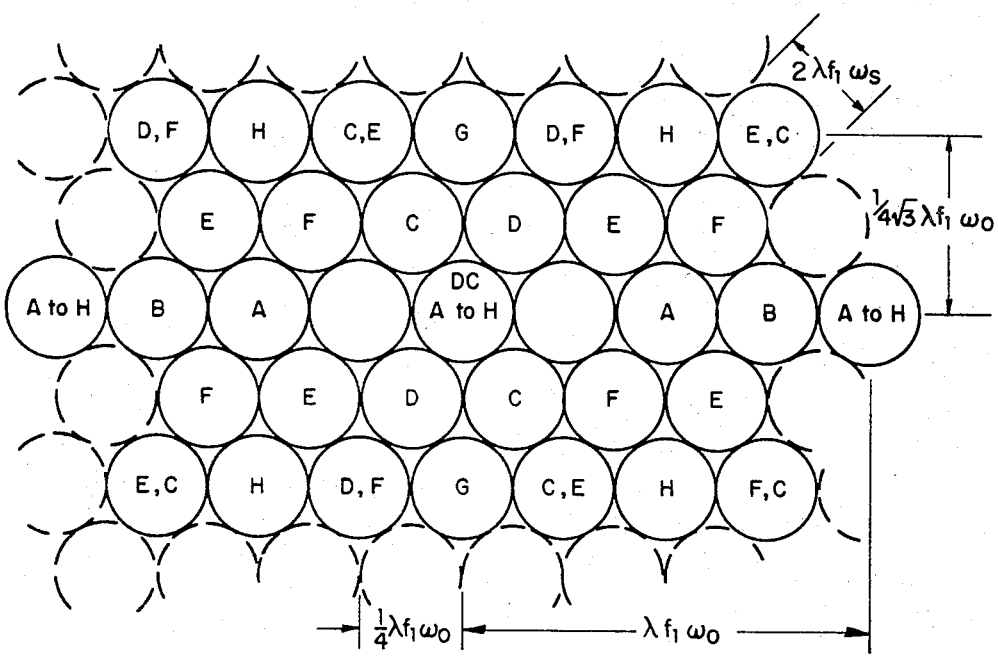
FIG. 7 illustrates a diffraction pattern obtained when the number of images is increased to eight.

The system described permits storage of up to four images. The maximum number of stored images can be increased to eight with a diffraction pattern arrangement as illustrated in FIG. 7 by imposing the following limitations on the system. The interlace screen frequency, $\omega_0$, must equal at least eight times the maximum scene frequency $\omega_s$. The respective grating angles and frequencies for the eight images are tabulated below:

| Image No. | Grating Angle | Grating Freq. |
|---|---|---|
| 1 | 0° | $\omega_0/2$ |
| 2 | 0° | $\omega_0 3/4$ |
| 3 | 60° | $\omega_0/4$ |
| 4 | 120° | $\omega_0/4$ |
| 5 | 150° | $\omega_0 \sqrt{3/4}$ |
| 6 | 30° | $\omega_0 \sqrt{3/4}$ |
| 7 | 90° | $\omega_0 \sqrt{3/4}$ |
| 8 | 40°54′ | $\omega_0 \sqrt{19/8}$ |

FIGS. 5 and 7 are two examples of multiple image diffraction patterns according to the invention. By proper selection of grating and screen frequencies and angular orientation coordinated with maximum scene resolution frequency, different numbers of images can be interlaced for optimum separation. In each case a first diffraction order of any given grating with the image spectrum centered in it should be substantially free from the interference of spectra derived from other images.

While the invention has been described in relation to specific embodiments, various modifications thereof will be apparent to those skilled in the art and it is intended to cover the invention broadly within the spirit and scope of the appended claims.

I claim:

1. A photostorage process comprising:
   (a) exposing an area of a photosensitive medium to a first object function periodically sampled along an interlace vectorial direction;
   (b) multiplying said first object by a first spatial carrier whose direction vector is angularly distinct from said interlace vectorial direction; and
   (c) exposing said medium area to a second object function periodically sampled along said interlace vectorial direction but at a different spatial phase such that said first and second object functions are recorded in an interlaced configuration, said second object function being multiplied with a second spatial carrier whose direction vector is angularly distinct from that of said first carrier and from said interlace vectorial direction, the angular separation of said direction vectors of said first and second spatial carriers and said interlace configuration being effective to cause harmonic orders of said first and second object functions to be spatially distinct and non-overlapping in a Fraunhofer diffraction pattern of the record thus formed.

2. The method of claim 1 including spectrally filtering the transmitted object spectra to associate a different radiation band with retrieved first and second object functions.

3. A photostorage process comprising:
   (a) exposing an area of a photosensitive medium to a first object function periodically sampled along an interlace vectorial direction at a sampling frequency $\omega_0$;
   (b) multiplying said first object function with a first spatial carrier having a direction vector substantially parallel to the interlace vectorial direction and a frequency $\omega_0/2$;
   (c) exposing said medium area to a second object function periodically sampled along said interlace vectorial direction and interlaced with said first object function;
   (d) multiplying said second object function with a second spatial carrier having a direction vector angled at substantially 60° with respect to said interlace vectorial direction and having a frequency substantially equal to $\omega_0/2$;
   (e) exposing said medium to a third object function periodically sampled along said interlace vectorial direction and interlaced with said first and second object functions;
   (f) multiplying said third object function with a spatial carrier angled at substantially 90° with respect to said interlace vectorial direction having a frequency substantially equal to $\omega_0 3/2$;
   (g) exposing said medium area to a fourth object function periodically sampled along said interlace vectorial direction and interlaced with said first, second, and third object functions; and
   (h) multiplying said fourth object function with a spatial carrier angled at substantially 120° with respect to said interlace vectorial direction and having a frequency substantially equal to $\omega_0/2$, the angular separation of said direction vectors of said spatial carriers and said interlace configuration being effective to cause harmonic orders of said object functions to be spatially distinct and non-overlapping in a Fraunhofer diffraction pattern of the record thus formed.

4. A photostorage and retrieval process comprising:
   (a) exposing an area of a photosensitive medium to a first object function periodically sampled along an interlace vectorial direction;
   (b) multiplying said first object function by a first spatial carrier whose direction vector is angularly distinct from said interlace vectorial direction;
   (c) exposing said medium area to a second object function periodically sampled along said interlace vectorial direction but at a different spatial phase such that said first and second object functions are recorded in an interlaced configuration;
   (d) multiplying said second object function with a second spatial carrier whose direction vector is angularly distinct from that of said first carrier and from said interlace vectorial direction;
   (e) illuminating the record thus formed with a beam of light having at least partial coherence at the record;
   (f) forming in a Fourier transform space the Fraunhofer diffraction pattern of said record, the angular separation of said direction vectors of said first and second spatial carriers and said interlace configuration being effective to cause diffracted spectral orders of said first and second object functions to be spatially separated and non-overlapping in said transform space; and
   (g) selectively transmitting through said transform space the object spectra appropriate for the recovery of a desired one or more object functions.

5. The method of claim 4 including spectrally filtering the transmitted object spectra to associate a different radiation band with retrieved first and second object functions.

6. The method of claim 4 wherein the frequency of said first spatial carrier is different from that of said second carrier.

7. The method of claim 6 wherein said illuminating of said record is accomplished with an effective point source of light.

References Cited

UNITED STATES PATENTS 3,312,955  4/1967  Lamberts et al.
3,314,052  4/1967  Lohmann.

OTHER REFERENCES

"Theta Modulation in Optics," by J. D. Armitage and A. W. Lohmann—April 1965. Applied Optics, pp. 399–403.

"Velocity and Frequency Filtering of Seismic Data Using Laser Light," by Dobrin, Ingalls, and Long—Conduction Corporation, Nov. 19, 1964, presented at 34th Annual International Meeting of Society of Exploration Geophysicists—pp. 13, 14, 15, Fig. 15.

NORTON ANSHER, *Primary Examiner.*

RICHARD M. SHEER, *Assistant Examiner.*